United States Patent
Haho et al.

(10) Patent No.: US 7,612,722 B2
(45) Date of Patent: Nov. 3, 2009

(54) MOBILE COMMUNICATION DEVICE WITH REDUCED ELECTRIC FIELD EMISSION LEVELS NEAR THE EARPIECE

(75) Inventors: Mikko Haho, Tyrnava (FI); Asko Rintamaki, Tampere (FI); Jarmo Kenttala, Oulu (FI); Marko Autti, Oulu (FI)

(73) Assignee: Nokia Corporation, Espoo (FI)

( * ) Notice: Subject to any disclaimer, the term of this patent is extended or adjusted under 35 U.S.C. 154(b) by 381 days.

(21) Appl. No.: 11/344,841

(22) Filed: Jan. 31, 2006

(65) Prior Publication Data

US 2007/0176833 A1    Aug. 2, 2007

(51) Int. Cl.
*H01Q 1/24*    (2006.01)
(52) U.S. Cl. ........................... 343/702; 343/846
(58) Field of Classification Search ........... 343/702, 343/700 MS, 846, 848, 718
See application file for complete search history.

(56) References Cited

U.S. PATENT DOCUMENTS

| | | | |
|---|---|---|---|
| 2002/0011956 A1* | 1/2002 | Ito | 343/702 |
| 2003/0058177 A1* | 3/2003 | Nishikido et al. | 343/702 |
| 2003/0117324 A1* | 6/2003 | Iwai et al. | 343/702 |
| 2004/0246184 A1* | 12/2004 | Demicco et al. | 343/702 |
| 2006/0017624 A1* | 1/2006 | Nagano et al. | 343/702 |
| 2006/0290574 A1* | 12/2006 | Tsai et al. | 343/700 MS |

* cited by examiner

*Primary Examiner*—HoangAnh T Le
(74) *Attorney, Agent, or Firm*—Locke Lord Bissell & Liddell LLP

(57) ABSTRACT

A mobile communication device (1) is provided with an antenna (10) having an antenna element (10a) and a conductive ground element (26) to cooperate with the antenna element. In use, RF currents are generated in the conductive ground element and as a result an oscillating electric field arises. The conductive ground element is arranged in the device (1) such that the point of highest electric field is located away from the region where the earpiece (5) is positioned in order to reduce the emission of the electric field to the ear (12). The conductive ground element (26) may be provided in a conductive layer of the Printed Circuit/Wire Board (24) of the device. The point of highest electric field in a in a conductive layer arises at the end of the physical path near a physical end of the layer, which in a conventional flip-phone typically corresponds to the top of the first hinged body part (2) where the earpiece (5) is also positioned. According to the invention, the layer is serpentine shaped and arranged such that the end of the electrical path of the Printed Circuit/Wire Board is located approximately half a wavelength of the oscillating field away from the area of the earpiece. Alternatively, tracks or wires (27, 28) acting as ground extensions may be connected to the ground plane (26) to move the end of the electrical path and the high electric field away from the region of the earpiece.

15 Claims, 4 Drawing Sheets

MOBILE COMMUNICATION DEVICE WITH REDUCED ELECTRIC FIELD EMISSION LEVELS NEAR THE EARPIECE

FIELD OF THE INVENTION

The invention relates to a mobile communication device with a reduced electric field in the vicinity of its earpiece. More particularly, the invention relates to a mobile communication device which is compatible with hearing aids.

BACKGROUND

It is well known that electromagnetic radiation can interfere with the functions of electronic equipment such as computers, airplane equipment and medical equipment. By their very nature, mobile phones provide a source of electromagnetic radiation and in many situations it is desirable that mobile phones be used in the vicinity of other electronic equipment without producing interference. For example, it is necessary for a wearer of a hearing aid that the radiation from a mobile phone does not interfere with the hearing aid to such an extent that the audio signals from the mobile phone earpiece cannot be heard by the wearer of the hearing aid. The introduction of digital wireless technologies has further worsened the effects of mobile phone interference in hearing aids. Hearing aids have been developed that are more immune to electromagnetic radiation than hitherto, but this has only alleviated the problem. In order to overcome the problem fully, the radiation reaching the ear of a user needs to be reduced.

There are many products on the market for reducing the electromagnetic radiation reaching the ear of a mobile phone user but the effectiveness of the products varies. Some products come in the form of accessories for the mobile phone, such as neck loops that plug into compatible phones and inductively couple to the telecoil of the hearing aid such that the phone can be kept at a distance from the hearing aid. Other products are incorporated into the design of the mobile phone, such as radiation shields positioned between the ear and the antenna. However, neck loops require users to buy additional electronic devices in order to be able to use the mobile phone, which increases costs, and shields are considered by many to have a detrimental effect on the attractiveness of the mobile phone. Thus, the solutions offered by these products are not satisfactory.

There is evidence that behind the ear hearing aids are more susceptible to interference than in-the-ear hearing aids and custom canal aids, possibly because the smaller aids are worn further away from the antenna of the phone, are shielded by the user's head and may have less gain. Similarly, it has been noticed that in some circumstances flip phones cause less interference compared to standard bar phones since the antenna of a flip phone is typically located further away from the user's ear, when the phone is in use, compared to the antenna of a standard bar phone. However, due to the limited size of modern mobile phones, the circuits of flip phones are often designed such that although the main antenna element is located away from the earpiece, the electric field around the earpiece is still high. In more detail, the Printed Wire Board of the phone (PWB) is often used as a ground plane that cooperates with the main antenna element. Consequently, currents and electric fields are generated in the PWB. The earpiece is typically located near the physical end of the phone, which coincides with the physical end of the PWB and therefore the end of the electrical path of the ground plane provided on the PWB. The end of the electrical path is also the part of the PWB with the highest impedance. Consequently, the point of strongest electric field in the PWB is located in the vicinity of the earpiece even though the main antenna element is located away from the earpiece.

In some countries, regulations issued by governmental organisations force mobile phone manufacturers to ensure that at least a percentage of their phones are hearing aid compatible. For example, in the US, by $18^{th}$ Feb. 2005, half of all mobile phone handsets must be designed such that the radiation around the earpiece does not exceed specific RF interference levels as defined by an ANSI standard for hearing aid compatibility. The standard sets out maximum allowed values for both the peak electric field emission and the peak magnetic field emission around the earpiece. According to the ANSI standard, both hearing aids and mobile phones are given a rating equal to a number. If the sum of the ratings for a phone and a hearing aid being used together is equal to five or higher, the combination is acceptable for normal use. By $18^{th}$ Feb. 2005, half of all mobile phones offered by a manufacturer in the US must have a rating of 3 of higher. According to the current standard, for a mobile phone to qualify for a rating of 3, the peak e-field emission levels near the earpiece must be between 41 and 36 dB (V/m)+0.5×AWF and the peak H-field emission levels must be between −14.4 and −9.4 dB (A/m)+0.5 AWF, where AWF is the absolute weighting function. To get a rating of 4, the e-field emission near the earpiece must be less than 36 dB (V/m)+0.5×AWF and the h-field emission must be less than −14.4 dB (A/m)+0.5*AWF. These regulations put additional pressure on manufacturers to manufacture mobile phones that use internal means to reduce the amount of radiation emitted at the location of the earpiece but that still has a design that appeals to customers.

The invention addresses the above and other issues.

SUMMARY OF THE INVENTION

According to the invention, there is provided a mobile communication device including a body, an earpiece and an antenna comprising: an antenna element; and a conductive ground element to cooperate with the antenna element, provided in the body and in use having an oscillating electric field generated therein, the conductive ground element having an end at which, in use, a maximum electric field is generated, said end being positioned in the body away from said earpiece to minimise transmission thereof to a user's ear.

The mobile communication device may further comprise a printed circuit/wire board and the conductive ground element may be provided as a conductive layer in said board.

The conductive layer may have a serpentine shape having a first end electrically coupled to the antenna element and a second end located a first distance away from the earpiece. The first distance is determined in dependence on the wavelength of the radiation the antenna emits. Preferably, the first distance is approximately a quarter of the wavelength of the e-field oscillation.

Alternatively, the conductive ground element may comprise a conductive ground plane extending along the body and at least one ground extension having a first end and a second end, the first end being connected to the ground plane. The conductive ground plane may be provided as a conductive layer that covers part of the PWB. The ground extension may be a track on the PWB or a wire connected to the PWB.

The device may be a flip phone having a first hinged body part and a second hinged body part and the printed wire/circuit board and the earpiece may be located in the first hinged body part. The flip phone may be configured to operate in the GSM 850 MHz network.

BRIEF DESCRIPTION OF THE DRAWINGS

Embodiments of the invention will now be described by way of example, with reference to the accompanying drawings, in which.

DETAILED DESCRIPTION

Figure 1:
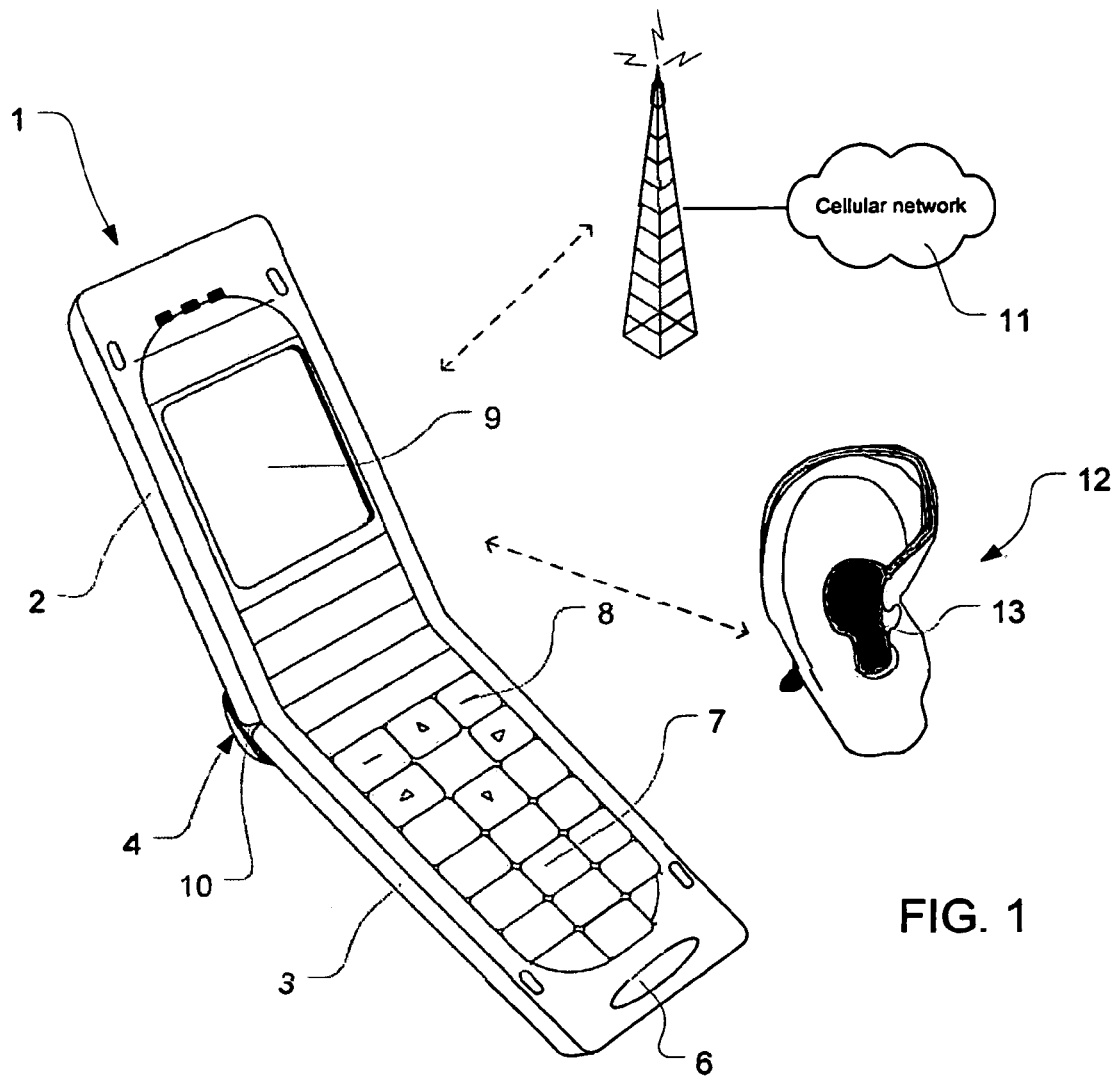
FIG. 1 is a perspective view of an open handset for a flip mobile phone.
Figure 2:
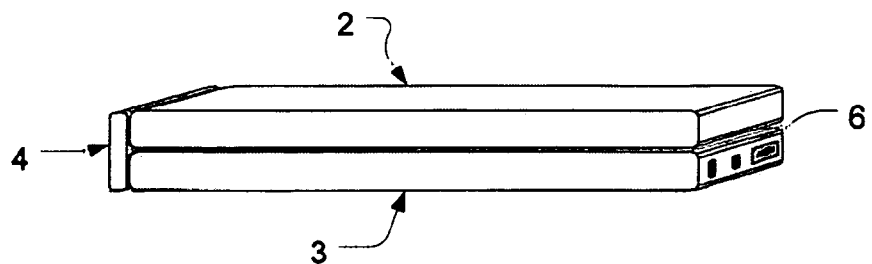
FIG. 2 is a perspective view of the handset of FIG. 1 when it is closed.

Referring to FIGS. 1 and 2, a mobile station in the form of a flip mobile telephone handset 1 includes a first hinged body part 2, a second hinged body part 3 and a linking body part 4 for housing a hinge between the first and second body parts. The handset further comprises an earpiece 5, a microphone 6, a keypad 7, with soft keys 8 which can be programmed to perform different functions, an LCD display 9 and an internal antenna 10 including an element located in the linking body part. The earpiece is located in the first hinged body part 2 and the microphone is located in the second hinged body part 3.

The handset is operable to communicate through cellular radio links with one or more individual public land mobile networks (PLMNs) 11 based on technologies including but not limited to the TDMA and CDMA technologies.

In FIG. 1 the handset 1 is open, whereas in FIG. 2 the handset is folded in its closed state. When a user makes a call using the handset, the handset is opened as in FIG. 1 and the user places the earpiece 5 near his or her ear 12 and talks into the microphone 6. If the user uses a hearing aid 13, the audio signals output by the earpiece 5 are picked up by the hearing aid 13 and amplified further before being fed to the inner parts of the ear 12. A high electric field associated with the handset 1 may interfere with the operation of the hearing aid 13. For example, the electromagnetic field present around the antenna of a digital mobile phone has a pulsing pattern that may be picked up by the microphone or telecoil circuitry of the hearing aid and heard as a "buzz" by the wearer of the hearing aid. The higher the field near the earpiece of the phone, the higher the intensity of the radiation generated by the field and transmitted to the hearing aid in the user's ear.

Figure 3:
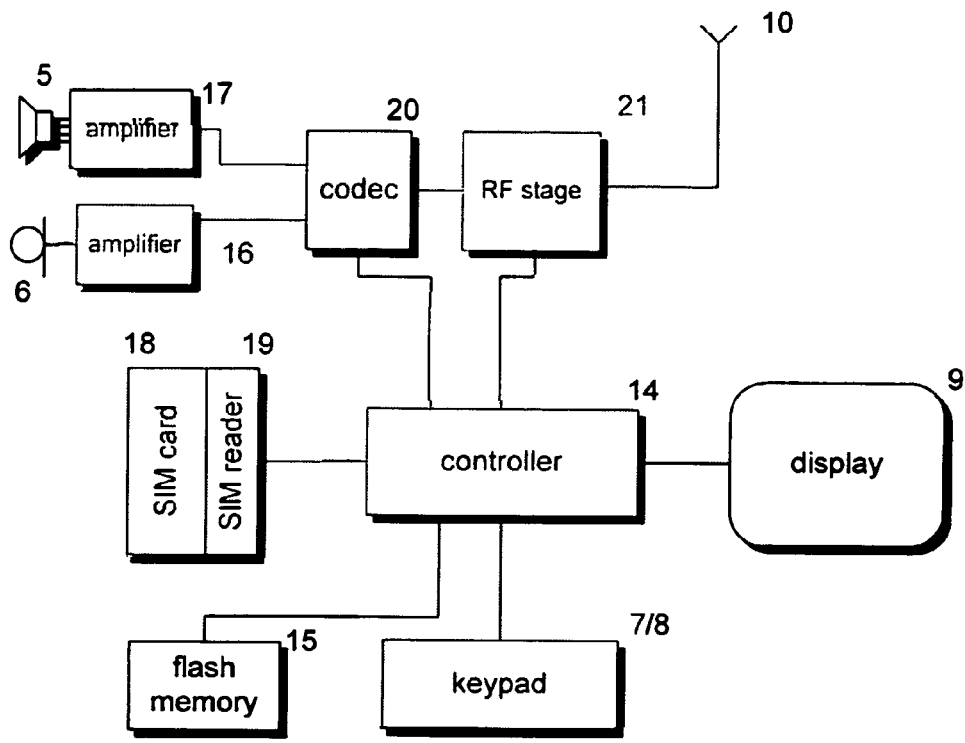
FIG. 3 is a schematic diagram of mobile telephone circuitry for use in the handset of FIGS. 1 and 2.

FIG. 3 illustrates the major circuit components of the handset 1. Signal processing is carried out under the control of a digital microcontroller 14, which has an associated flash memory 15. Electrical analog audio signals are produced by microphone 6 and amplified by pre-amplifier 16. Similarly, analog audio signals are fed to the speaker 5 through an amplifier 17. The microcontroller 14 receives instruction signals from the keypad 7 and soft keys 8 and controls operation of the LCD display 9.

Information about the identity of the user is held on a smart card 18 in the form of a GSM SIM card. The SIM card is removably received in a SIM card reader 19. The handset circuitry includes a codec 20 and an rf stage 21 connected to the antenna 10. The coder 20 receives analog signals from the microphone amplifier 16, digitizes them into a GSM signal format and feeds them to the rf stage 21 for transmission through the antenna 10 to the network 11. Similarly, signals received from the network 11 are fed through the antenna 10 to be demodulated in the rf stage 21 and fed to codec 20, so as to produce analog signals fed to the amplifier 17 and earpiece 5.

Figure 4:
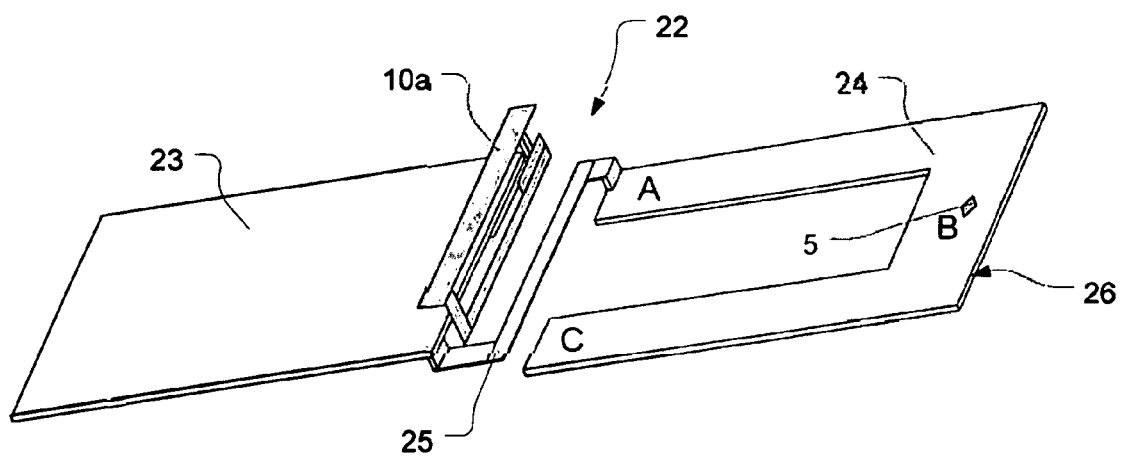
FIG. 4 shows a Printed Wire Board and antenna element for use in the handset of FIGS. 1 and 2.

The components described with respect to FIG. 3 are wired to a printed wire board (PWB) 22, an example of which is shown in FIG. 4. The components could also be mounted on a Printed Circuit Board (PCB). Any references to a PWB below should be interpreted as also referring to a PCB. The PWB of FIG. 3 comprises two components, the first PWB 23, located in the first body part 2 of the handset, and the second PWB 24, located in the second body part 3. The first and second PWBs are connected via a conductor 25, which is housed in the linking body part 4. The antenna 10 includes a main antenna element 10a that is mounted on the second PWB and housed in the linking member 4. Typically, the earpiece 5 is positioned near the edge of the first PWB as shown in FIG. 4. The microphone is positioned near the edge of the second PWB.

The second PWB is shaped as a solid rectangle, whereas the first PWB has a serpentine shape or a U-shape, with the opening of the U facing towards the second PWB and the main antenna element 10a. In a conventional PWB, the first PWB would have the same shape as the second PWB, i.e. a solid rectangular shape. However, the shape of the first PWB shown in FIG. 3 reduces the electric field near the earpiece 5 as will be described in more detail below.

The main antenna element 10a is electrically coupled to both the first and the second PWB. Each of the PWBs includes a solid conductive layer 26 that acts as a ground plane for the antenna. The PWBs 23, 24 and the antenna element 10a can be considered to make up the two arms of a dipole antenna 10. As a result there are RF currents running in both the main antenna element 10a and the PWBs. The oscillation of the current causes the emission of radiation from the antenna, as is well known in the art. The phase of the current in the PWBs is opposite to the current in the main antenna element 10a. The currents in the first PWB follow the electrical path indicated in FIG. 4 by numerals A, B and C. The electrical path is short enough compared to the wavelength of the radiation for the phase of the current at A, B and C to be different. Moreover, the movement of electric charge in the PWB generates an oscillating electric potential, which in turn generates an oscillating electric field throughout the ground plane. Consequently, the electric field along the electrical path is different at different points. The points of highest electric field are separated in the electrical path by half a wavelength of the oscillation field. Moreover, one point of highest electric field coincides with the end of the electrical path at the open end of the PWB, C, since the charge carriers have nowhere to go here and the charge builds up. As a result, the point of lowest magnitude of electric field is located a quarter of a wavelength away from the end of the electrical path of the PWB. The first PWB of FIG. 4 is arranged such that the end of the electrical path, point C, is located approximately quarter of a wavelength away from the earpiece 5. Thus, the electric field and the electric field emission level at the earpiece are minimised.

If the antenna is configured to operate in the GSM 850 MHz network, the wavelength of the radiation in air, where the relative permittivity is near 1, is approximately 35 cm and a quarter of a wavelength is therefore 8.75 cm. Considering the impact of the materials around the PWB on the relative permittivity of the ground plane (26), the wavelength of the oscillating field is less than 35 cm and a conductor shorter than 8.75 is therefore needed for the phase of the RF currents to change from a maximum value to a minimum value. Consequently, for a handset of typical size, operating in the GSM 850 MHz network, there is sufficient space in the handset to position the end of the electrical path in the ground plane (26) such that the earpiece is located near a point of minimum electric field.

Figure 5:
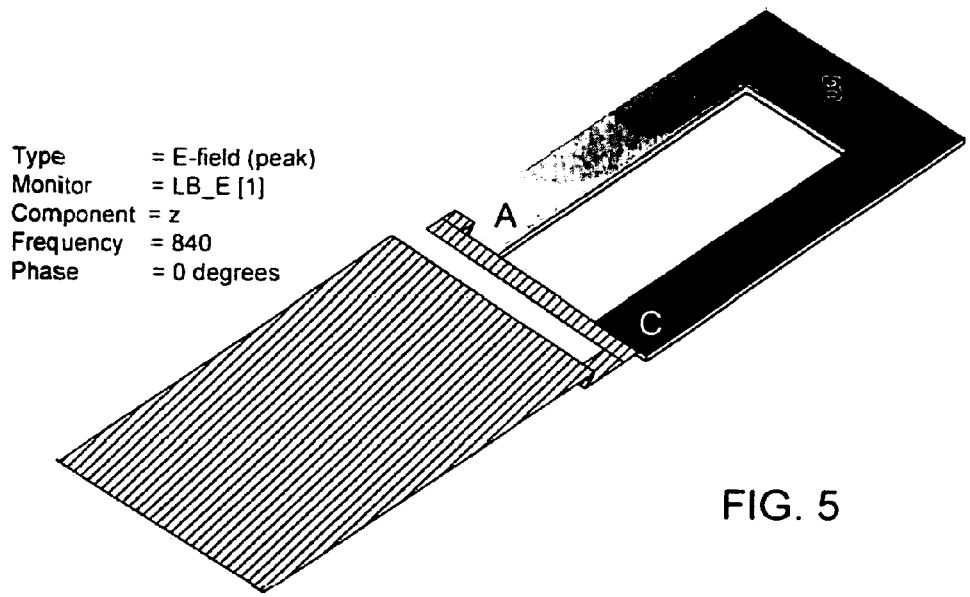
FIG. 5 shows the variation in the electric field along the PWB of FIG. 4.
Figure 5:
Figure 6:
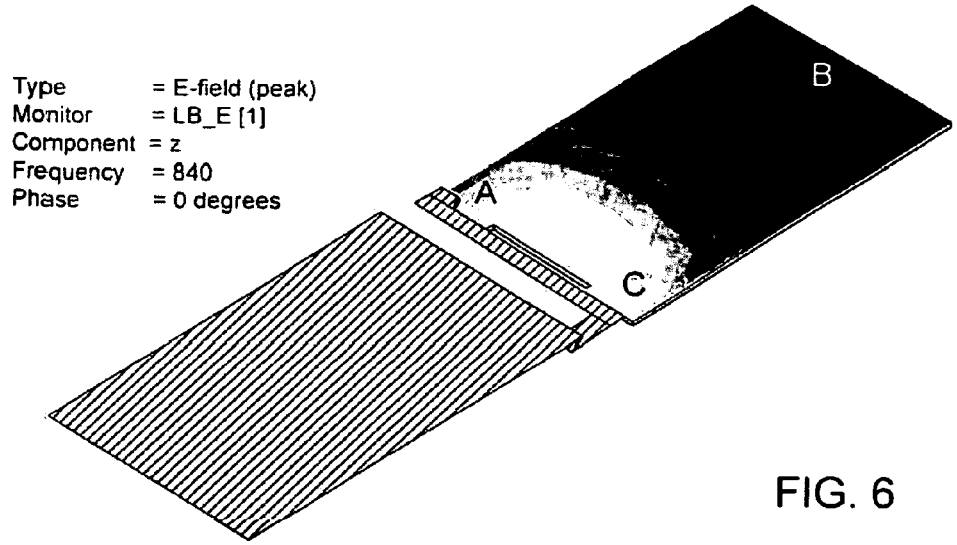
FIG. 6 shows the variation in the electric field along a conventional PWB for the handset of FIGS. 1 and 2.
Figure 6:
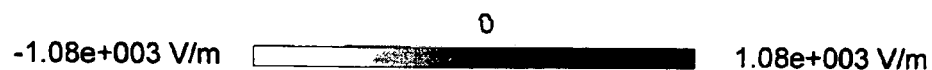

FIGS. 5 and 6 show the result of a simulation of the electric field variation along the electrical path in a PWB according to the invention and in a rectangle shaped PWB, respectively. The z-component of the peak e-field is measured for a frequency of 840 Hz and a phase shift of 0.

In FIG. 5, the electric field has a maximum negative value at point A, which increases to a value of zero electric field at point B. The electrical path then turns back on itself towards point C and the electric field continues to increase to a maximum positive value at point C, the end of the electrical path on the PWB. When the PWB is installed in the mobile phone, the earpiece will be located near point B, where the electric field is zero or close to zero.

In FIG. 6, where a conventional, solid, rectangular PWB is shown, the maximum positive value of the electric field occurs near point B, since this is the end of the electric path on the PWB. Compared to this arrangement, low band (frequency lower than 1 GHz) electric field emission near the earpiece can be reduced by approximately 10 dB by changing the shape of the board to the shape shown in FIG. 5.

Referring to FIG. 6 again, due to the closeness to the antenna and the cabling between the first and second PWBs, another high impedance point occurs at the opposite end of the board to point B, i.e. between points A and C. As a result, the electric field here is at a maximum negative value even though the total length of the electrical path is less than half a wavelength. However, since the electrical path in FIG. 6 is shorter than the electrical path in FIG. 5, the value of the maximum electric field in FIG. 6 is smaller than the value of the maximum electric field in the PWB according to the invention.

In FIGS. 5 and 6, the variation of the electric field in the second PWB is not shown. However, if the second PWB includes a ground element for the antenna, there will be electric fields in the second PWB as well as in the first PWB.

Figure 7:
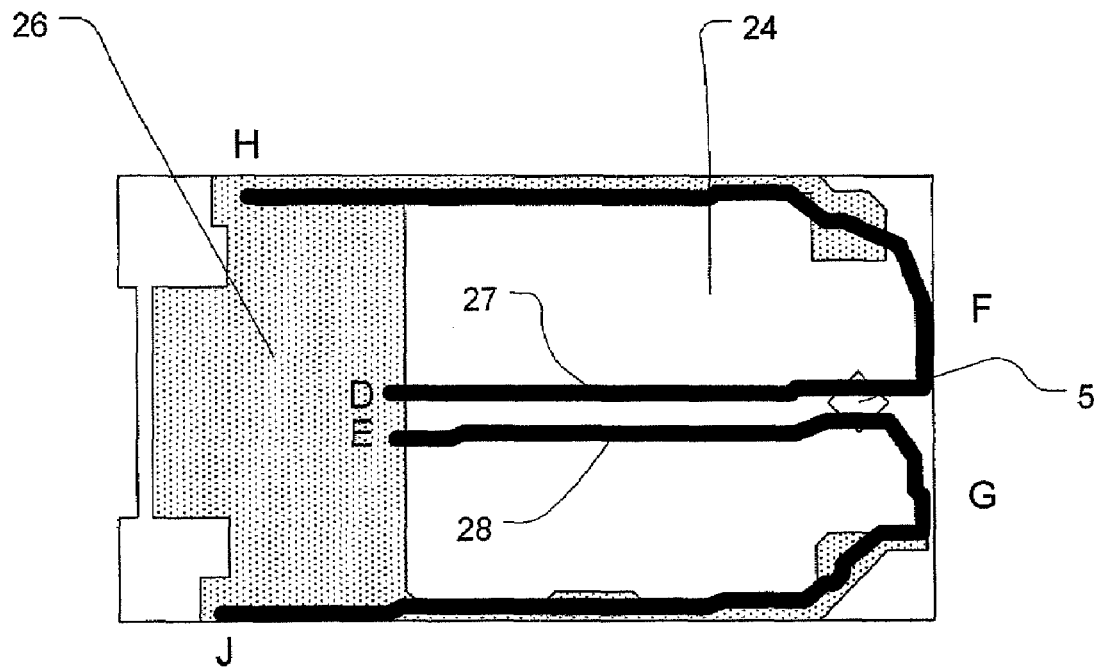
FIG. 7 schematically illustrates another PWB for use in the handset of FIGS. 1 and 2.

Referring to FIG. 7, another example of a ground element configuration, according to the invention, to cooperate with a main antenna element 10a for use in the handset of FIG. 1 is shown. In the PWB of FIG. 7, a conductive layer 26, shown schematically with a dotted surface, acts as a solid ground plane for the main antenna element 10a. The conductive layer 26 only covers part of the PWB 24. Two tracks 27, 28 on the PWB are connected to the conductive layer 26 at points D and E respectively. The tracks extend along the PWB towards the side of the PWB where the earpiece 5 is located, points F and G respectively, and back again. The tracks have floating ends at points H and J respectively, i.e. the ends are not connected to ground. The tracks act as ground extensions and extend the electrical path of the RF current such that the point of maximum electric field is located away from the earpiece. Preferably, the length of electrical path between the floating ends at points H and J and points F and G near the earpiece 5 is approximately one quarter of a wavelength of the electric field oscillation. However, smaller and larger distances are possible as well, as long as the point of maximum electric field is located away from the earpiece.

Figure 8:
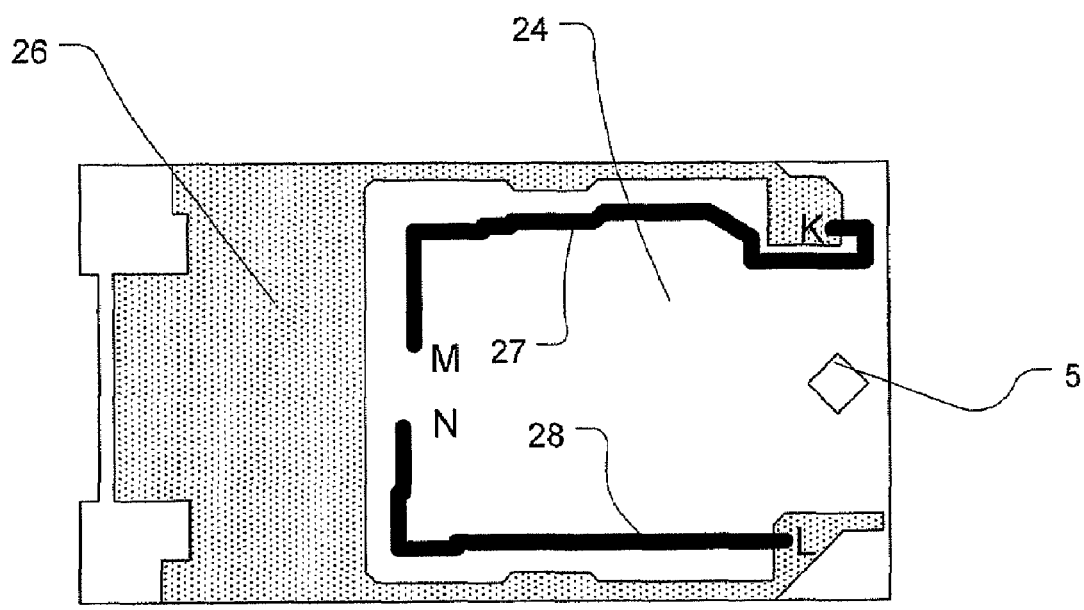
FIG. 8 schematically illustrates yet another PWB for use in the handset of FIGS. 1 and 2.

Referring to FIG. 8, a third example of a ground element configuration, according to the invention, to cooperate with a main antenna element 10a for use in the handset of FIG. 1 is shown. Similarly to FIG. 7, a conductive layer 26 acting as a ground plane only covers part of the PWB and tracks 27, 28, connected to the ground plane, act as ground extensions to move the point of highest electric field magnitude away from the location of the earpiece. The tracks of FIG. 8 are arranged in a different manner to the tracks of FIG. 7. The tracks are connected to the ground plane at positions K and L respectively, located at the side of the PWB near the earpiece 5. The tracks extend along the PWB towards the side of the antenna and end at points M and N respectively. As shown in FIG. 8, the ends are not connected to ground. Consequently, the RF currents experience high impedance at points M and N and a high electric field is generated here. If the distance of the electrical path of the tracks between points M and K and between points N and L is near a quarter of a wavelength of the oscillation of the electric field, the earpiece 5 will be positioned near the point of minimum electric field and the transmission of the electric field to the user's ear will be reduced.

Although the tracks have been described with respect to FIGS. 7 and 8 to be located on the PWB, it should be realised that the tracks can be replaced by wires connected to the ground plane of the board but ending on, for example, a floating ground parallel but separate to the PWB. Alternatively, the wires may be connected to a conductive layer mounted to the cover of the phone.

Many other modifications and variations of the described examples of the invention can be carried out. For example, although the invention has been described with respect to a flip mobile phone, the invention can be implemented in a handset of any design. Moreover, the invention is not restricted to mobile phone handsets and can be used for any communication device emitting radiation that interferes with another electronic device.

The invention claimed is:

1. A mobile communication device including a body, an earpiece and an antenna comprising:
   an antenna element; and
   a conductive ground element provided in the body to cooperate with the antenna element and in use having an oscillating electric field generated therein, the conductive ground element having an end at which, in use, a maximum electric field is generated, said end being positions in the body away from said earpiece to minimise transmission of the field to a user's ear, wherein the conductive ground element comprises a conductive ground plane extending along the body and at least one ground extension connected to the ground plane.

2. A mobile communication device according to claim 1 further comprising a circuit/wire board and wherein the conductive ground element is provided in a conductive layer of said board.

3. A mobile communication device according to claim 2, wherein said conductive layer has a serpentine shape having a first end electrically coupled to the antenna element and a second end located a first distance away from the ear piece.

4. A mobile communication device according to claim 3, wherein the antenna is tuned to emit and receive radiation of a specific wavelength and wherein the first distance is determined in dependence on said specific wavelength.

5. A mobile communication device according to claim 3, wherein the first distance is a multiple of a quarter of a wavelength associated with the oscillating electric field.

6. A mobile communication device according to claim 2 wherein the device is a flip mobile phone having a first hinged body part and a second hinged body part and wherein said board and said earpiece is provided in the first hinged body part.

7. A mobile communication device according to claim 1 further comprising a PWB and the conductive ground plane is provided as a conductive layer that covers part of the PWB.

8. A mobile communication device according to claim 7, wherein the at least one ground extension is a track on the PWB and has a first end connected to the ground plane and a second end that is a floating end.

9. A mobile communication device according to claim 7, wherein the at least one ground extension is a wire and has a first end connected to the ground plane and a second end that is connected to a foil in a cover of the mobile communication device.

10. A mobile communication device according to claim 7, wherein the device is a flip mobile phone having a first hinged body part and a second hinged body part and wherein said PWB is provided in the first hinged body part.

11. A mobile communication device according to claim 1 configured to operate in the GSM 850 MHz network.

12. A mobile communication device according to claim 11, wherein the peak electric field emission near the earpiece is lower than 41 dB (V/m) when the absolute weighting function is zero.

13. A mobile communication device according to claim 1, wherein the electric field emission level at the earpiece is compatible with a hearing aid.

14. A mobile communication device including a body, an earpiece and an antenna comprising:

an antenna element; and a conductive ground element provided in the body to cooperate with the antenna element and in use having an oscillating electric field generated therein, the oscillating electric field having a first associated wavelength and the conductive ground element having an electric path including a first and a second end, the earpiece being located in the body of the mobile communication device approximately a quarter of a wavelength away from said first and second ends, wherein the ground element includes a conductive layer on a printed wire board and at least one ground extension connected to the conductive layer.

15. A mobile communication device according to claim 14 configured to operate in the GSM 850 MHz network.

* * * * *

UNITED STATES PATENT AND TRADEMARK OFFICE
CERTIFICATE OF CORRECTION

PATENT NO.         : 7,612,722 B2                                    Page 1 of 1
APPLICATION NO.    : 11/344841
DATED              : November 3, 2009
INVENTOR(S)        : Mikko Haho et al.

It is certified that error appears in the above-identified patent and that said Letters Patent is hereby corrected as shown below:

On the Title page, under Item (75) Inventors:

Please delete "Tampere" and insert --Ruutana--.

Signed and Sealed this

Twenty-second Day of December, 2009

David J. Kappos
*Director of the United States Patent and Trademark Office*